US010161801B2

(12) United States Patent
Purohit et al.

(10) Patent No.: US 10,161,801 B2
(45) Date of Patent: Dec. 25, 2018

(54) METHOD AND APPARATUS FOR DETECTING DIRECTION OF MOTION WITH A PASSIVE SENSOR

(71) Applicant: Google Inc., Mountain View, CA (US)

(72) Inventors: Aveek Ravishekhar Purohit, Mountain View, CA (US); Kenneth Louis Herman, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/000,094

(22) Filed: Jan. 19, 2016

(65) Prior Publication Data

US 2017/0205289 A1   Jul. 20, 2017

(51) Int. Cl.
  *G01J 5/34* (2006.01)
  *G01J 5/08* (2006.01)
  *G06K 9/00* (2006.01)
  *G06T 7/20* (2017.01)

(52) U.S. Cl.
  CPC ........ *G01J 5/0806* (2013.01); *G06K 9/00362* (2013.01); *G06T 7/20* (2013.01)

(58) Field of Classification Search
  CPC ....................................................... G01J 5/30
  See application file for complete search history.

(56) References Cited

U.S. PATENT DOCUMENTS 5,291,020 A * 3/1994 Lee ...................... G08B 13/191
                                                          250/338.3
5,374,854 A   12/1994 Chen et al.
5,844,240 A * 12/1998 Lee ........................... G01J 5/02
                                                          250/342
7,155,317 B1 * 12/2006 Tran ................... H05B 37/0227
                                                          307/117
7,183,912 B2   2/2007 Micko
7,399,969 B2   7/2008 Micko
7,399,970 B2   7/2008 Micko
            (Continued)

OTHER PUBLICATIONS

"Passive Infrared Sensor", Wikipedia, https://en.wikipedia.org/wiki/Passive_infrared_sensor, viewed on Dec. 28, 2015.
(Continued)

*Primary Examiner* — Michael C Bryant
(74) *Attorney, Agent, or Firm* — Morris & Kamlay LLP (57) ABSTRACT

A passive infrared sensor system for detecting the direction of movement by a warm object includes a passive infrared sensor and a lens having multiple lenslets. Different lenslets may have different lens characteristics, for example, different focal lengths or thicknesses, to produce focused infrared beams of different intensities for the sensor. As a warm object, such as a person or an animal, moves from one location to another in the field of view of the sensor, the infrared energy emitted by the warm object may be focused by different lenslets having different focal lengths or thicknesses, and the sensor may detect different intensities at different times. A processor may estimate the direction of movement by performing pattern matching of the detected intensities with a database of patterns based on actual statistics or simulations of movements by warm objects in the environment monitored by the sensor, or known characteristics of the environment and the sensor.

21 Claims, 9 Drawing Sheets

(56) References Cited

U.S. PATENT DOCUMENTS

| | | | |
|---|---|---|---|
| 7,755,052 B2 | 7/2010 | Micko et al. | |
| 2013/0053099 A1* | 2/2013 | Nabata | G01J 5/047 455/556.1 |
| 2013/0119256 A1* | 5/2013 | Husmann | G01N 27/82 250/341.8 |
| 2014/0103214 A1* | 4/2014 | Messiou | G08B 13/193 250/349 |

OTHER PUBLICATIONS

"PIR Sensor", Wikipedia, http://www.tech-faq.com/pir-sensor.html, viewed on Dec. 28, 2015.

* cited by examiner

METHOD AND APPARATUS FOR DETECTING DIRECTION OF MOTION WITH A PASSIVE SENSOR

BACKGROUND

Passive sensors, such as passive infrared sensors, have been used for the detection of humans, animals, vehicles, or other moving objects. Unlike an active sensor, a passive sensor may not normally be able to measure the range or distance between the sensor and a moving object directly. Due to the lack of range information, a passive sensor may not be able to detect the direction of motion of an object. Active sensors, such as radars or a laser detectors, may detect the direction of motion based on measured ranges and angles, but they are typically more expensive than passive sensors.

BRIEF SUMMARY

According to an embodiment of the disclosed subject matter, a system for detecting a warm moving object includes a passive infrared sensor configured to detect infrared energy emitted by the object, a lens having multiple lenslets configured to focus the infrared energy emitted by the object from different directions to produce different intensities of infrared energy at different times, and a processor, coupled to the passive infrared sensor, configured to estimate the direction of motion of the object based on the detected intensities.

According to an embodiment of the disclosed subject matter, a method for detecting a warm moving object includes providing a passive infrared sensor, providing a lens having multiple lenslets configured to focus the infrared energy emitted by the object from different directions to produce different intensities of infrared energy at different times, and providing a processor, coupled to the passive infrared sensor, configured to estimate the direction of motion of the object based on the detected intensities.

According to an embodiment of the disclosed subject matter, an apparatus for detecting a warm moving object includes a memory and a processor in communication with the memory. In an embodiment, the processor is configured to execute instructions to estimate the direction of motion of the warm moving object based on detected intensities of infrared energy emitted by the object, focused by different lenslets of a lens, and received by a passive infrared sensor from different directions at different times.

According to an embodiment of the disclosed subject matter, means for detecting a warm moving object are provided, which include means for estimating the direction of motion of the warm moving object based on detected intensities of infrared energy emitted by the object, focused by different lenslets of a lens, and received by a passive infrared sensor from different directions at different times.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

A passive infrared sensor may detect infrared radiation from objects within its field of view. Unlike active infrared sensors, passive infrared sensors does not radiate, and instead may detect infrared radiation only from other sources. Heat energy emitted by various objects may be detected as infrared radiation, which is invisible to human eyes. Passive infrared sensors may be made of various types of pyroelectric materials, also called thermoelectric materials, for detecting infrared radiation. In some implementations, a pyroelectric or thermoelectric material may be deposited as a thin film, for example, and manufactured as a part of an integrated circuit. Pyroelectric or thermoelectric materials used for sensing infrared radiation may include gallium nitride (GaN), cesium nitrate (CsNO₃), polyvinyl fluorides, derivatives of phenylpyridine, and cobalt phthalocyanine, for example.

Figure 1:
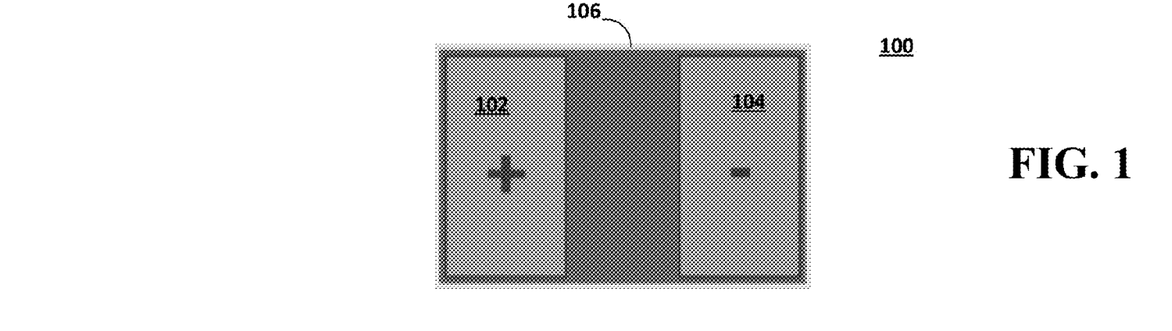
FIG. 1 shows a diagram illustrating an example of a passive infrared sensor according to embodiments of the disclosed subject matter.

FIG. 1 shows an example of a passive infrared sensor 100 according to embodiments of the disclosed subject matter. In the example shown in FIG. 1, the passive infrared sensor includes a first sensor element 102, a second sensor element 104, and a center region 106 separating the first and second sensor elements 102 and 104. Alternatively, the first and second sensor elements 102 and 104 may be provided next to one another without a center region separating the two sensor elements. One or more additional sensor elements may be provided in a passive infrared sensor, and the sensor elements may be arranged in various geometries within the scope of the disclosed subject matter.

The passive infrared sensor 100 with two sensor elements 102 and 104 as shown in FIG. 1 may detect differential infrared energy as a warm object, such as a person or an animal, moves from left to right (from the perspective of a viewer looking at FIG. 1) or from right to left in front of the sensor. For example, when a warm object begins to move from left to right, the first sensor element 102 may detect an increased amount of infrared radiation at an earlier time than the second sensor element 104. As the warm object moves to the right, i.e., away from the first sensor element 102 and closer to the second sensor element 104, the second sensor element 104 may detect an increased amount of infrared radiation while the amount of infrared radiation detected by the first sensor element 102 decreases. Conversely, if the warm object moves from right to left, the second sensor element 104 may detect an increased amount of infrared energy before the first sensor element 102. Based on the difference of time between detections of increased amounts of infrared energy by the first and second sensor elements 102 and 104, a determination may be made as to whether the warm object is moving from left to right or vice versa. Although the passive infrared sensor 100 as shown in FIG. 1 is described as having left and right sensor elements 102 and 104 for the convenience of description, such sensors are not limited to detecting movements in the left-to-right or right-to-left direction. In some implementations, the signal from one of the sensor elements may be subtracted from the signal from the other sensor element, to generate a resultant signal having a phase which may provide an indication of whether the first sensor element was excited before the second sensor element, or vice versa. In some implementations, the angle of movement by the warm object may be computed based on the relative magnitudes of infrared energy received by the sensor elements as the warm object moves along a path.

Figure 2:
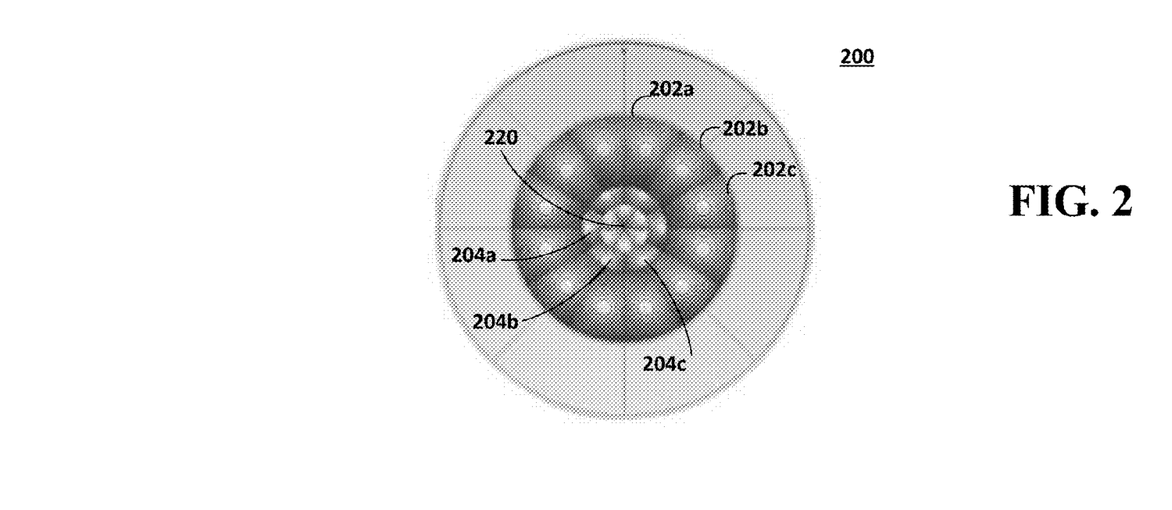
FIG. 2 shows a diagram illustrating an example of a lens with multiple lenslets that project focused infrared beams onto the passive infrared sensor of FIG. 1 according to embodiments of the disclosed subject matter.

FIG. 2 shows a diagram illustrating an example of a Fresnel lens 200 with multiple lenslets that project focused infrared beams onto the passive infrared sensor of FIG. 1 according to embodiments of the disclosed subject matter. In FIG. 2, the Fresnel lens 200 includes multiple lenslets, such as lenslets 202a, 202b, 202c, . . . 204a, 204b, 204c, . . . , arranged in a concentric pattern around the center 220 of the Fresnel lens 200. Various types of lenses with various geometries and various arrangements of lenslets may be implemented within the scope of the disclosed subject matter. In an embodiment, a passive infrared sensor, such as the passive infrared sensor 100 as shown in FIG. 1 and described above, may be provided behind the Fresnel lens 200 to receive infrared radiation from various directions focused by various lenslets of the Fresnel lens.

In some implementations, separate lenses instead of lenslets of a single lens may be provided in various physical arrangements to allow a passive infrared sensor to receive focused infrared radiation from various directions, for example. In some implementations, multiple passive infrared sensors, for example, passive infrared sensors arranged in an array or a matrix, may be provided. For economic reasons, a single passive infrared sensor, such as the sensor 100 with two sensor elements 102 and 104 as shown in FIG. 1, may be provided to receive focused infrared radiation from various directions, for example, from various lenslets such as lenslets 202a, 202b, 202c, . . . 204a, 204b, 204c, . . . of the Fresnel lens 200 as shown in FIG. 2. A sensor assembly including the passive infrared sensor 100 and the Fresnel lens 200 may be part of a multifunctional sensor, an embodiment of which will be described in further detail below with respect to FIG. 11. One of more of these sensors may be part of a sensor network, such as a smart-home network, an embodiment of which will be described in further detail below with respect to FIG. 12.

Figure 3:
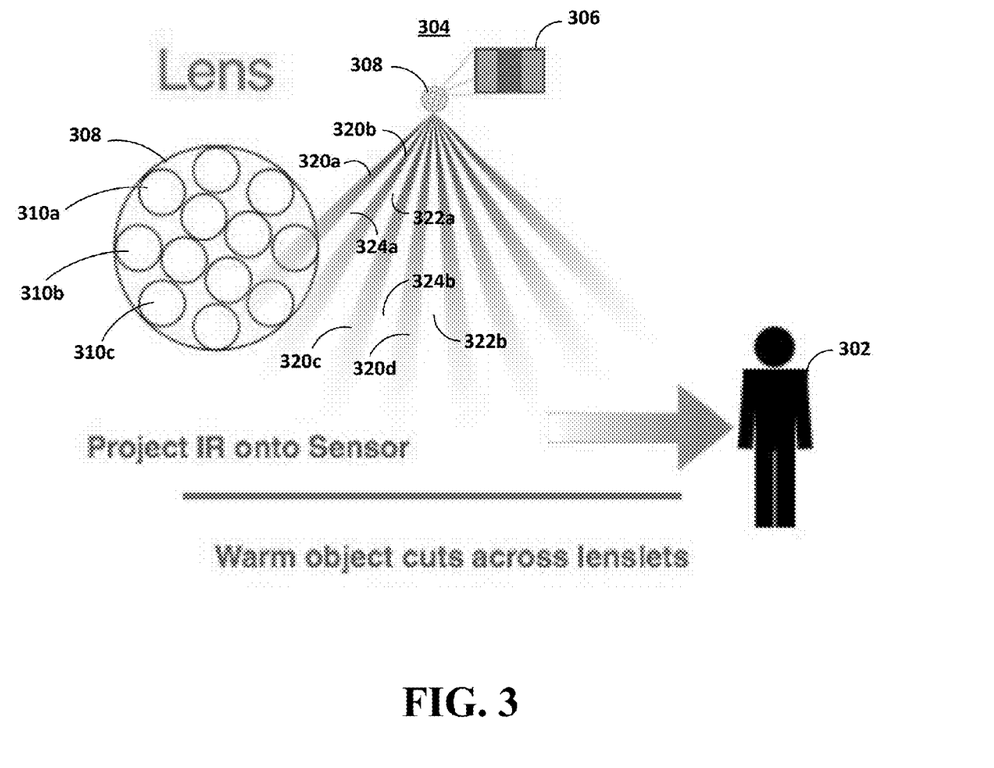
FIG. 3 shows a diagram illustrating a person or a warm moving object as viewed by a passive infrared sensor through multiple lenslets according to embodiments of the disclosed subject matter.

FIG. 3 shows a diagram illustrating a person or a warm moving object as viewed by a passive infrared sensor through multiple lenslets according to embodiments of the disclosed subject matter. A warm object 302, such as a person, moves from left to right (from the perspective of a viewer looking at FIG. 3), in front of a sensor assembly 304 that includes a passive infrared sensor 306 and a lens 308. An exploded view of the lens 308 illustrates multiple lenslets 310a, 310b, 310c, . . . . In the example shown in FIG. 3, the lenslets 310a, 310b, 310c, . . . of the lens 308 are arranged in a grid pattern. Alternatively, a Fresnel lens 200 with lenslets 202a, 202b, 202c, . . . 204a, 204b, 204c, . . . arranged in a concentric pattern as shown in FIG. 2 may be implemented in the sensor assembly of 304 in FIG. 3. In an embodiment, a passive infrared sensor 100 with two sensor elements 102 and 104 separated by a center region 106 as shown in FIG. 1 may be implemented as the sensor 306 in FIG. 3. Various other types of passive sensors and lenses also may be implemented within the scope of the disclosed subject matter.

Referring to FIG. 3, when the warm object 302 moves from left to right in front of the sensor assembly 304, the infrared energy generated by the warm object sweeps from left to right (from the perspective of a viewer looking at FIG. 3) over time, as indicated by sectors 320a, 320b, 320c, 320d, . . . , as viewed by the sensor assembly 304. The infrared radiation emitted by the warm object 302 may be focused by different lenslets of the lens 308 and sensed by the passive infrared sensor 306 when the warm object 302 moves across from left to right. Between any two adjacent lenslets of the lens 308, for example, there may be a region in which the infrared radiation emitted by the warm object 302 is focused by neither of the two adjacent lenslets. Thus, the passive infrared sensor 306 may receive a relatively low amount of infrared energy in this region. For example, in FIG. 3, regions of relatively low amounts of received infrared energy are indicated by gaps 322a, 322b, . . . between infrared beams focused by different lenslets as the warm object 302 moves from left to right over time.

In some implementations, a passive infrared sensor may have two separate sensor elements, such as the sensor 100 as shown in FIG. 1. With two separate sensor elements, additional gaps 324a, 324b, . . . may be formed between infrared beams received by different sensor elements of the passive infrared sensor as the warm object 302 moves closer to one sensor element and farther away from the other, even though the infrared energy received by the two sensor elements are focused by the same lenslet.

Figure 4:
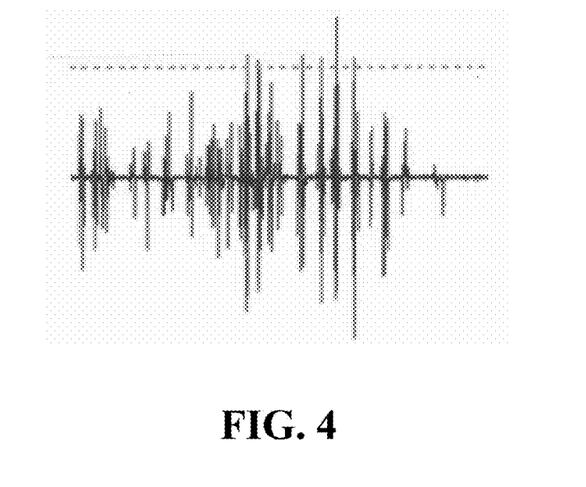
FIG. 4 shows an example of a graph illustrating the magnitude of sensor response over time for the passive infrared sensor according to embodiments of the disclosed subject matter.

FIG. 4 shows an example of a graph illustrating the magnitude of sensor response, that is, the received infrared signal strength, over time for the passive infrared sensor 306 of FIG. 3. As illustrated in FIG. 4, the sensor response includes large amplitudes or spikes separated by low amplitudes or gaps over time as the warm object moves across the field of view of the sensor assembly.

Figure 5:
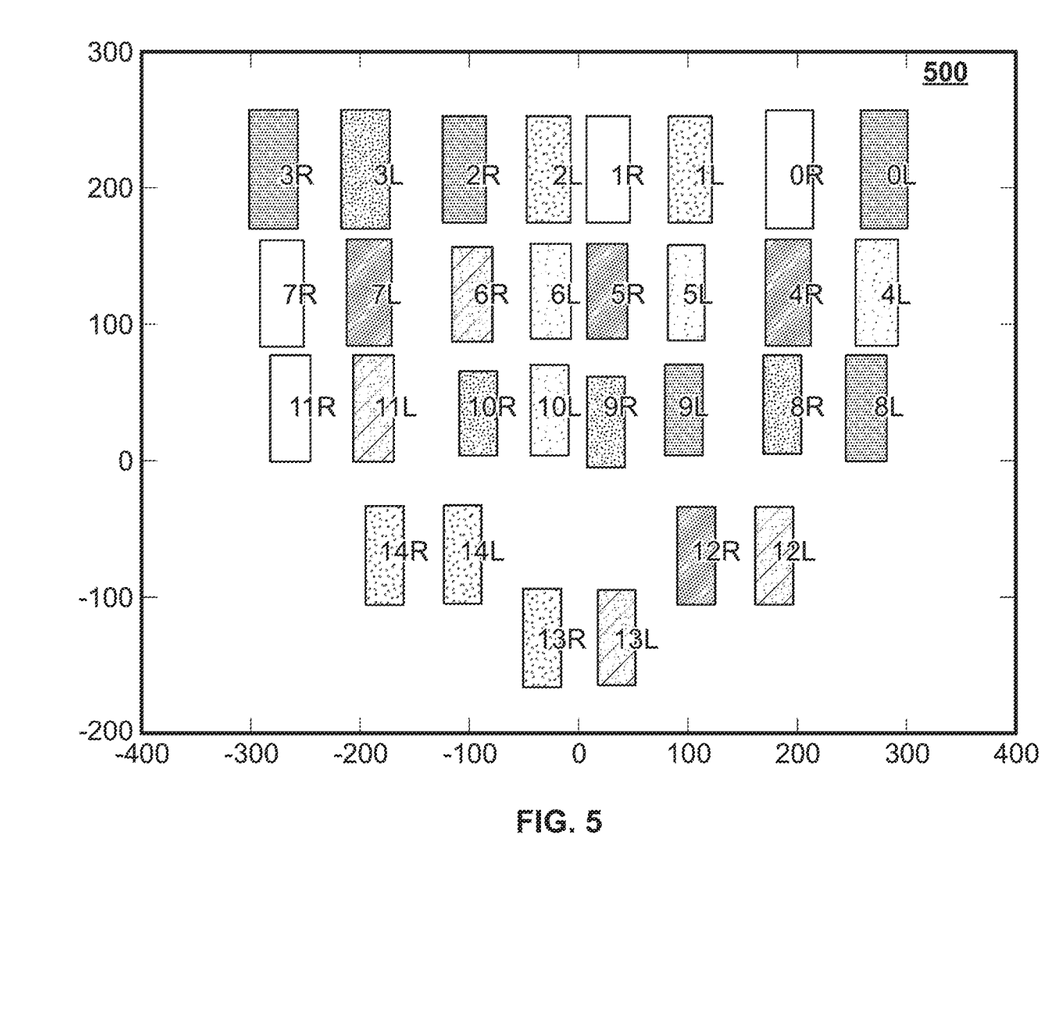
FIG. 5 shows a diagram illustrating an example of a field of view of a monitored area from the perspective of a passive infrared sensor with multiple lenslets generating different intensities of infrared energy intensities according to embodiments of the disclosed subject matter.

FIG. 5 shows a diagram illustrating an example of a field of view of a monitored area 500 from the perspective of a passive infrared sensor with multiple lenslets. The sensor detects different intensities of infrared energy corresponding to different amplitudes of infrared signals received through different lenslets according to embodiments of the disclosed subject matter. The monitored area 500 may be an area of an indoor environment such as a room, or an area of an outdoor environment. The sensor assembly (not shown) is assumed to be located somewhere above the monitored area 500. For example, the sensor assembly may be mounted on a wall at a height above the maximum height of the warm objects to be monitored. In an indoor environment such as a room, the sensor assembly may be mounted on a ceiling, for example. In order to obtain a panoramic view of the room, the sensor assembly may be mounted high above the floor or close to the ceiling to minimize dead spots in the monitored area. Alternatively, the sensor assembly may be mounted on the ceiling or suspended from the ceiling, for example.

In the embodiments described above, the sensor assembly includes a passive infrared sensor, such as a passive infrared sensor 100 with two sensor elements 102 and 104 as shown in FIG. 1, and a lens such as a Fresnel lens 200 with multiple lenslets 202a, 202b, 202c, . . . 204a, 204b, 204c, . . . . In these embodiments, each of the lenslets projects a focused infrared beam that moves across the right and left sensor elements of the passive infrared sensor when a warm object moves across the field of view of the sensor. For consistency with the description of "left" and "right" in FIG. 3, which represents a view opposite that of the passive infrared sensor, the "left" in FIG. 3 becomes the "right" in FIG. 5 and vice versa, because FIG. 5 represents the field of view from the sensor.

Referring to FIG. 5, the areas monitored by the right and left elements of the two-element passive infrared sensor through the lenslets are denoted as "3R," "3L", "2R," "2L,". . . , where the number preceding "R" and "L" denotes a number assigned to each individual lenslet. When a warm object moves across the field of view, the infrared signal received by the passive infrared sensor through one of the lenslets, which is positioned to focus the infrared energy emitted by the warm object at a given location at a given time, is intensified and thus has a higher amplitude or power than infrared signals received through other lenslets which are not positioned to focus the emitted infrared energy. For example, as a warm object moves horizontally across the field of view in FIG. 5, starting from 11R and ending at 8L, the two-element passive infrared sensor receives the highest-intensity infrared signal from the lenslets positioned to focus the infrared energy emitted from the warm object along the path of movement, successively in time, over the areas 11R, 11L, 10R, 10L, 9R, 9L, 8R and 8L.

In embodiments according to the disclosed subject matter, some or all of the lenslets of the lens may be encoded with different lens characteristics, such as focal lengths or thicknesses, for example, to change the intensities of focused infrared energy passing through these lenslets. By encoding some or all of the lenslets, the lens may act as a signal mask for the passive infrared sensor. In the description of embodiments of the disclosed subject matter, "encoding" of individual lenslets of a lens, such as a Fresnel lens, includes the processes of determining the amount of optical intensification that needs to be produced by a given lenslet to focus infrared energy emitted by a warm object from a given direction, determining the lens characteristics, such as the focal length or thickness, of the lenslet to produce the needed amount of optical intensification, and making a lens with multiple lenslets having different lens characteristics, such as focal lengths or thicknesses, to produce different amounts of intensification for incoming infrared energy from different directions. In some implementations, a lens such as a Fresnel lens with multiple lenslets of various focal lengths or thicknesses may be made by a skilled technician of ordinary skill.

Figure 6:
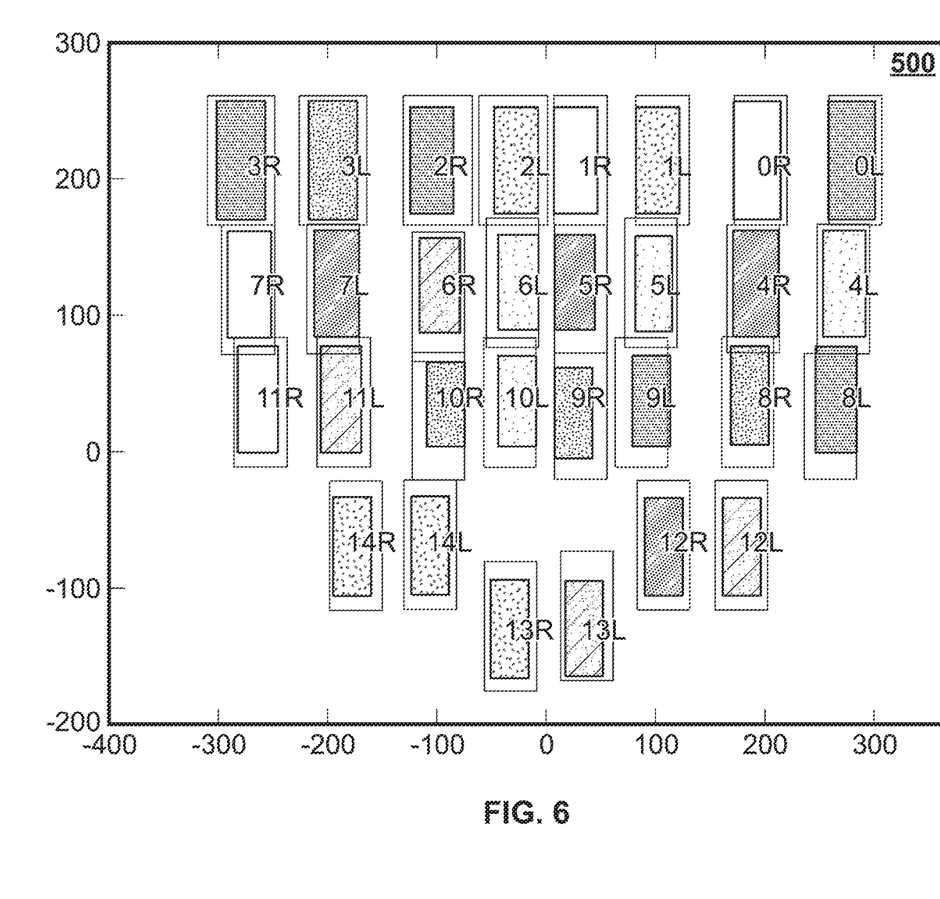
FIG. 6 shows a diagram illustrating an example of encoding of lenslets of a lens for direction detection according to embodiments of the disclosed subject matter.
Figure 13:
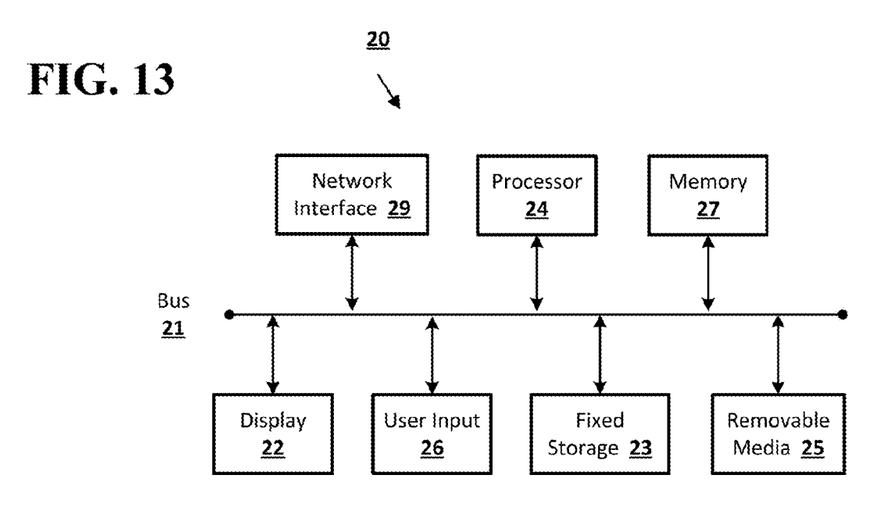
FIG. 13 shows an example of a computing device according to embodiments of the disclosed subject matter.

FIG. 6 shows an example of encoding of some or all of the lenslets of a lens for direction detection. The field of view 500 in FIG. 6 is the same as the field of view 500 from the perspective of the sensor assembly in FIG. 5 for simplicity of illustration. In some implementations, for a given environment, such as a room, it may be assumed that, statistically over multiple movements, warm objects may have relatively high probabilities of moving across central portions of the field of view 500 and relatively low probabilities of moving across portions of the field of view close to the edges or corners. Statistical samples to derive probabilities of movements over various areas within the field of view may be obtained by simulations or statistics of actual movements, examples of which will be described in further detail below with respect to FIG. 10 for pattern matching. Knowledge gained from simulations or statistics of actual movements may be included in a database and used for pattern matching in detecting direction of motion, for example. A database of patterns may also be obtained based on known characteristics of the sensor and the environment being monitored, for example. Such a database may be stored in a memory, such as memory 27 in a computing device 20 as shown in FIG. 13 and described below, for example.

Referring to the example of FIG. 6, areas indicated by relatively dark shades, such as the areas 10R, 10L, 9R, 9L, 6R, 6L, 5R and 5L, are near the center of the field of view 500. In contrast, areas indicated by relatively light shades, such as the areas 3R, 7R, 11R, 0L, 4L and 8L, are farther away from the center of the field of view 500. The relatively light shades for those areas may indicate relatively small peak magnitudes of infrared energy received from a warm object, such as a human being, moving in those areas focused by the corresponding lenslets. Based on the knowledge of different peak magnitudes for different areas within a field of view, the individual lenslets of a lens may be encoded correspondingly to cover movements by warm objects within that field of view. A series of peak magnitudes of received infrared energy may provide an indication of the direction or trajectory of movement of the warm object.

Depending on the environment being monitored, it is not necessary that areas near the center of a field of view have higher probabilities of detection of movements. In some implementations, the lenslets at or near the center of the field of view may not necessarily have focal lengths or thicknesses that produce the highest level of intensity, and the intensity levels produced by lenslets at or near the perimeters of the field of view may not be symmetric about the center. For example, if it is known that there are two doors near two corners on the same wall of a rectangular room being monitored, then there may be higher probabilities of people walking near the wall between the two corners instead of across the center of the room. In an embodiment, probabilities of movements by warm objects across various areas in the field of view of a passive infrared sensor may be obtained by recording statistics of actual movements by warm objects or simulations of movements based on knowledge of the environment being monitored, including, for example, known points of ingress and egress, walking paths, or obstructions such as furniture within the field of view.

Figure 7:
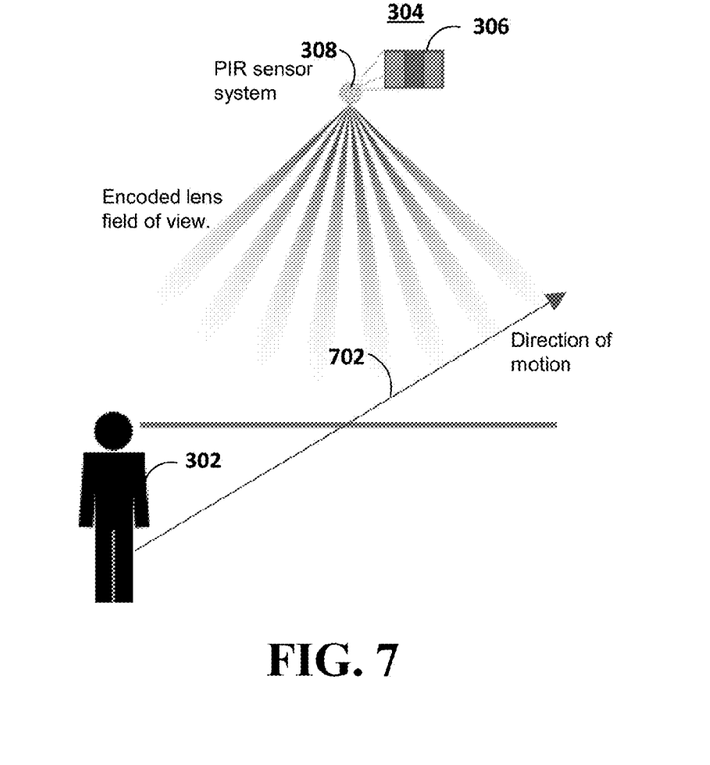
FIG. 7 shows a diagram illustrating a person or a warm object moving in a direction as viewed by a sensor assembly having a passive infrared sensor and a lens with multiple lenslets according to embodiments of the disclosed subject matter.
Figure 8:
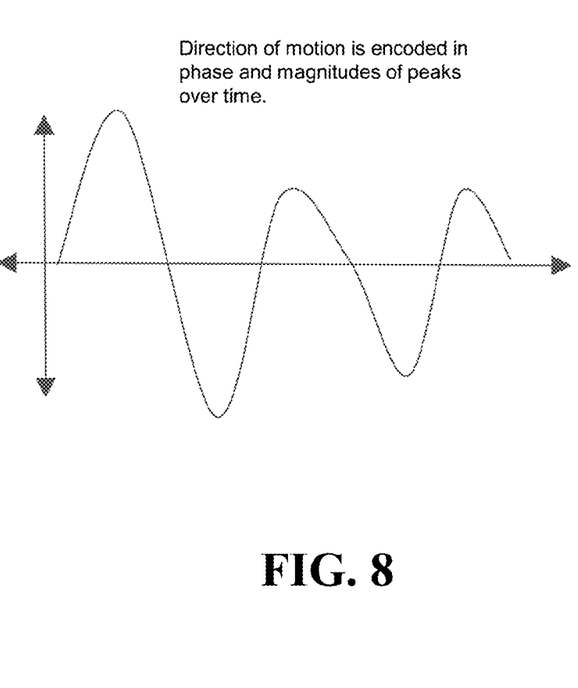
FIG. 8 shows a graph illustrating an example of a passive infrared signal corresponding to the intensity of infrared energy generated by a warm moving object and detected by the passive infrared sensor through the lenslets according to embodiments of the disclosed subject matter.

FIG. 7 shows a diagram illustrating a warm object 302, such as a person, moving in a given direction 702 as viewed by a sensor assembly 304 having a passive infrared sensor 306 and a lens 308 with multiple lenslets according to embodiments of the disclosed subject matter. As the warm object moves along the direction 702 in the field of view of the passive infrared sensor 306, which detects the amplitudes of infrared radiation focused by different lenslets of the lens 308 at different times, a passive infrared signal with a magnitude and a phase indicating a direction of motion over time is generated by the passive infrared sensor 306. FIG. 8 shows a graph illustrating an example of a passive infrared signal corresponding to the intensity of infrared energy generated by the warm moving object and detected by the passive infrared sensor through encoded lenslets of the lens over time, with peaks and phases signifying the direction of motion of the warm object. Although various embodiments described herein relate to the detection of infrared radiation originated by a warm object, such as a person, a passive infrared sensor also may detect cold objects that reflect infrared radiation from other sources, for example.

Figure 9:
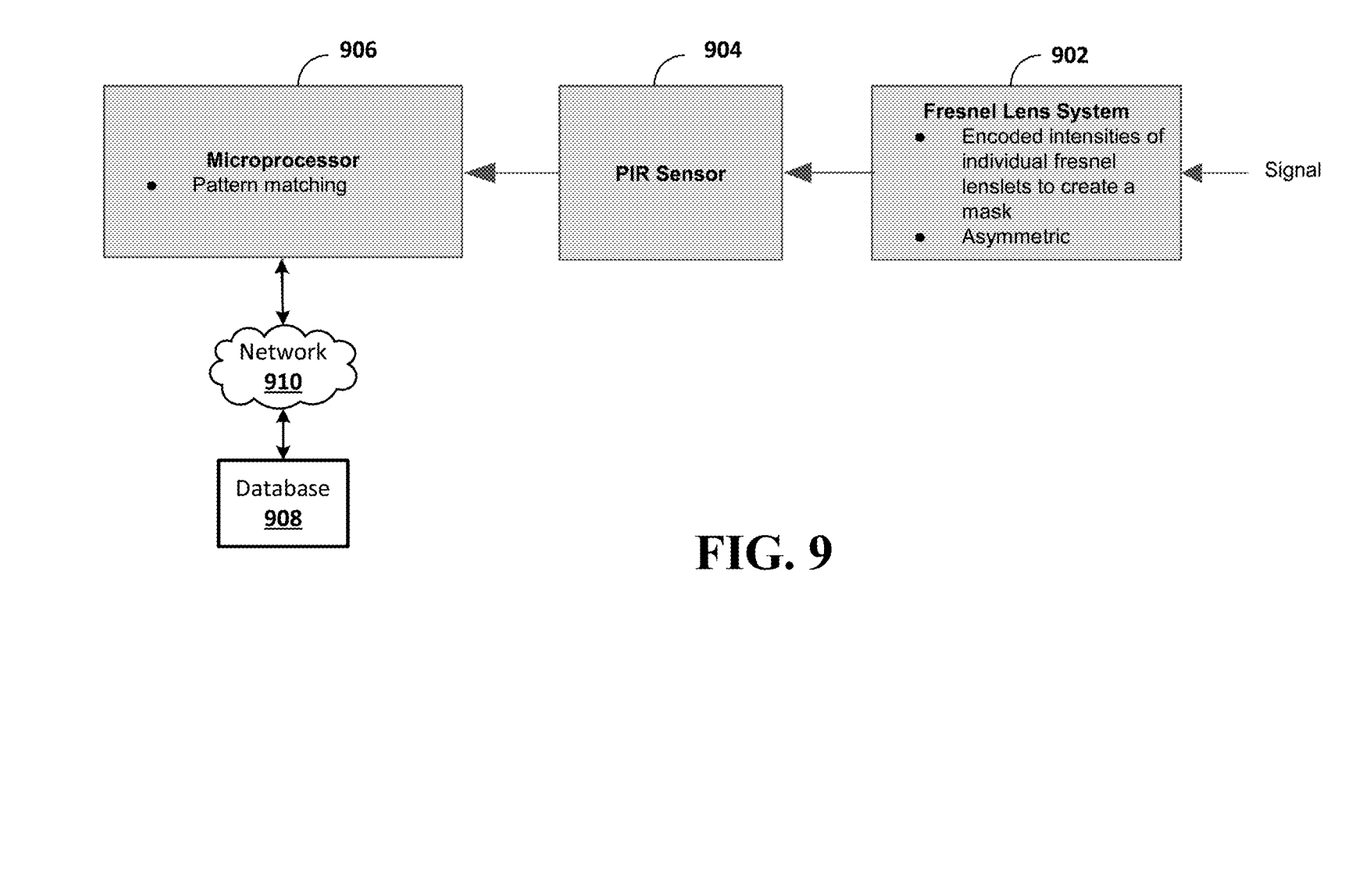
FIG. 9 shows a block diagram illustrating a system for enhanced infrared signal detection with multiple lenslets according to embodiments of the disclosed subject matter.

FIG. 9 shows a block diagram illustrating a system for enhanced infrared signal detection with encoded lenslets according to embodiments of the disclosed subject matter. In FIG. 9, an incoming infrared signal is received by a Fresnel lens system 902, which includes multiple lenslets encoded with various focal lengths or thicknesses to produce different levels of intensity of focused infrared beams. A Fresnel lens with lenslets individually encoded with different lens parameters, such as focal lengths or thicknesses, may be regarded as a signal mask to produce a focused infrared beam of varying intensities, depending on the direction of the incoming beam with respect to the lens.

Referring to FIG. 9, a passive infrared sensor 904 receives the focused infrared beam from the Fresnel lens system 902. As a warm object moves from one position to another within the field of view of the passive infrared sensor 904 over time, infrared energy emitted from the warm object is focused by different lenslets of the Fresnel lens system 902 at different times, resulting in different energy intensities as detected by the passive infrared sensor 904. In an embodiment, the passive infrared sensor 904 may generate a sensor output signal that represents the intensity of the focused infrared beam as detected by the sensor 904, and may transmit this output signal to a microprocessor 906. The output signal from the passive infrared sensor 904 may be a number that is proportional to the intensity of the infrared energy detected by the sensor 904, for example, or a number that represents a logarithmic value of the intensity of the detected infrared energy, for example.

In an embodiment, the microprocessor 906 may estimate the direction of motion of the warm object based on varying intensities of infrared energy detected by the passive infrared sensor 904 as a function of time, and matching the varying intensities of the detected infrared energy with patterns stored in a database 908, for example, based on prior simulations of warm moving objects and the sensor system in the environment being monitored. The database 908 may be local to or remote from the microprocessor 906 in various configurations. For example, the microprocessor 906 access the database 908 through a network 910, which may be a personal area network (PAN), a local area network (LAN), a wide area network (WAN), or a cloud network. Alternatively, the microprocessor 906 may access the database 908 directly.

Figure 10:
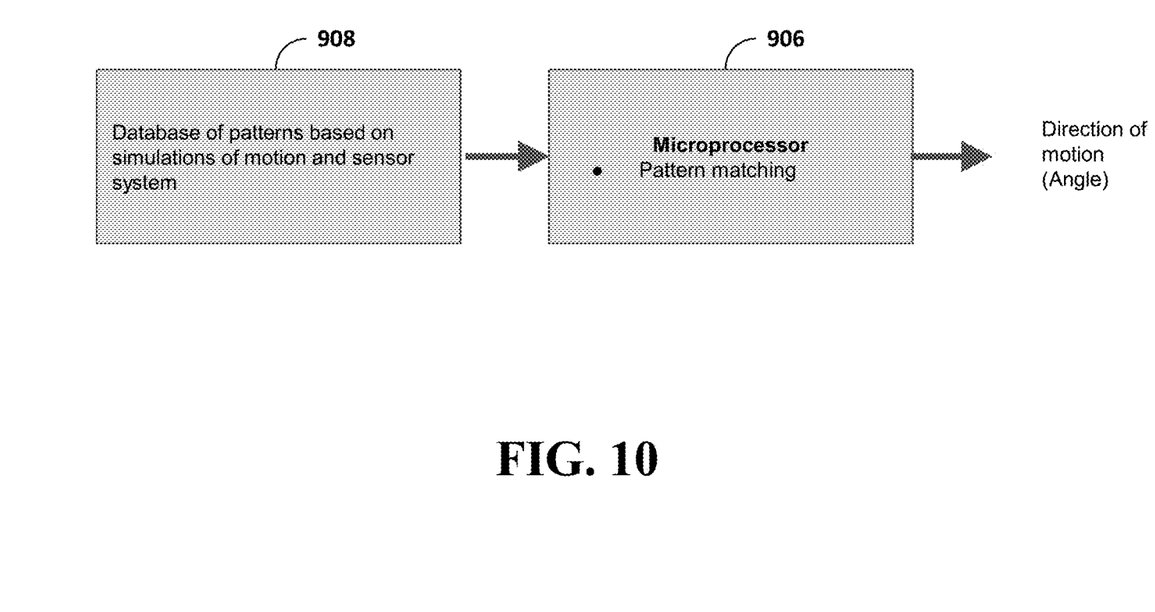
FIG. 10 shows a block diagram illustrating a system for pattern matching based on a database of stored patterns in a given environment according to embodiments of the disclosed subject matter.

FIG. 10 shows a block diagram illustrating a system for pattern matching based on simulations of the sensor and warm moving objects within the field of view of the sensor in a given environment. In FIG. 10, a database of patterns 908 may be generated based on simulations of warm moving objects and detections of infrared energy emitted by such warm moving objects. In an embodiment, the microprocessor 906 performs pattern matching by using the database of patterns 908 and comparing such patterns with received energy intensities of the infrared signals detected by the passive infrared sensor 904 through different lenslets of the lens system 902 over time to estimate the direction of motion of a warm object.

In a given indoor environment such as a room, for example, it may be expected that areas near the ingress or egress points, such as doors, or areas unoccupied by furniture, may experience human movements more frequently than areas occupied by furniture or areas with obstructions. In a home security system, for example, a passive infrared sensor may be placed near or far from areas that experience frequent human traffic. Thus, the patterns of infrared signal detection may depend on the location of the sensor as well as the frequency or likelihood of movement over given areas in a given environment. In some embodiments, a database of patterns of warm moving objects in relation to a passive infrared sensor may be based on statistics of actual movements by the objects and intensities of infrared energy detected by the sensor over time. In some embodiments, a database of patterns may be based on simulated movements by warm objects as detected by the passive infrared sensor. In some embodiments, a database of patterns may be generated by using known characteristics of the sensor and the environment being monitored, including, for example, the location of the sensor, the locations of walkways, doors and windows, or the locations of furniture, fixtures or obstructions over areas that are unlikely to experience frequent human traffic.

Embodiments disclosed herein may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 11:
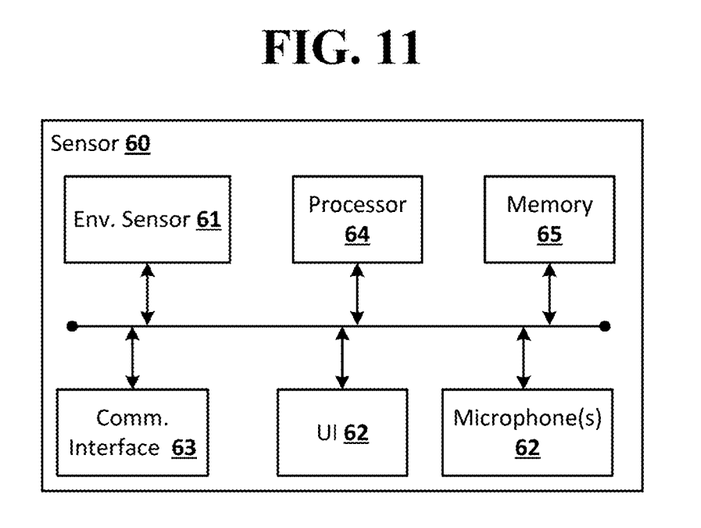
FIG. 11 shows an example of a sensor according to embodiments of the disclosed subject matter.

A sensor may include hardware in addition to the specific physical sensor that obtains information about the environment. FIG. 11 shows an example of a sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. data. A communication interface 63, such as a Wi-Fi or other wireless interface, Ethernet or other local network interface, or the like, may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

As a specific example, a sensor may include a sensor assembly, such as a sensor assembly 304 having a passive infrared sensor 306 and a lens 310 with lenslets 310a, 310b, 310c, . . . , as shown and described in further detail with respect to FIG. 3. A specific example of a passive infrared sensor may include a passive infrared sensor 100 with two sensor elements 102 and 104 separated by a center region 106 as shown and described in further detail with respect to FIG. 1. A specific example of a lens may include a Fresnel lens 200 with lenslets 202a, 202b, 202c, . . . . Other types of passive sensors and lenses also may be implemented for direction detection within the scope of the disclosed subject matter.

In some configurations, two or more sensors may generate data that can be used by a processor of a system to generate a response and/or infer a state of the environment. For example, an ambient light sensor may determine that it is dark (e.g., less than 60 lux) in the room of a home in which it is located. A microphone may detect a sound above a set threshold, such as 60 dB, in the home. The processor may determine, based on the data generated by both sensors that it should activate all of the lights in the room. In the event the processor only received data from the ambient light sensor, it may not have any basis to alter the state of the lighting in the room. Similarly, if the processor only received data from the microphone, it may not make sense to activate the lights in the room because it is daytime or bright in the room (e.g., the lights are already on). As another example, two or more sensors may communicate with one another. Thus, data generated by multiple sensors simultaneously or nearly simultaneously may be used to determine a state of an environment and, based on the determined state, generate a response.

Data generated by one or more sensors may indicate patterns in the behavior of one or more users and/or an environment state over time, and thus may be used to "learn" such characteristics. For example, data generated by an ambient light sensor in a room of a house and the time of day may be stored in a local or remote storage medium with the permission of an end user. A processor in communication with the storage medium may compute a behavior based on the data generated by the light sensor. The light sensor data may indicate that the amount of light detected increases until an approximate time or time period, such as 3:30 PM, and then declines until another approximate time or time period, such as 5:30 PM, at which point there is an abrupt increase in the amount of light detected. In many cases, the amount of light detected after the second time period may be either below a dark level of light (e.g., under or equal to 60 lux) or bright (e.g., equal to or above 400 lux). In this example, the data may indicate that after 5:30 PM, an occupant is turning on/off a light as the occupant of the room in which the sensor is located enters/leaves the room. At other times, the light sensor data may indicate that no lights are turned on/off in the room. The system, therefore, may learn that occupants patterns of turning on and off lights, and may generate a response to the learned behavior. For example, at 5:30 PM, a smart home environment or other sensor network may automatically activate the lights in the room if it detects an occupant in proximity to the home. In some embodiments, such behavior patterns may be verified using other sensors. Continuing the example, user behavior regarding specific lights may be verified and/or further refined based upon states of, or data gathered by, smart switches, outlets, lamps, and the like.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 12:
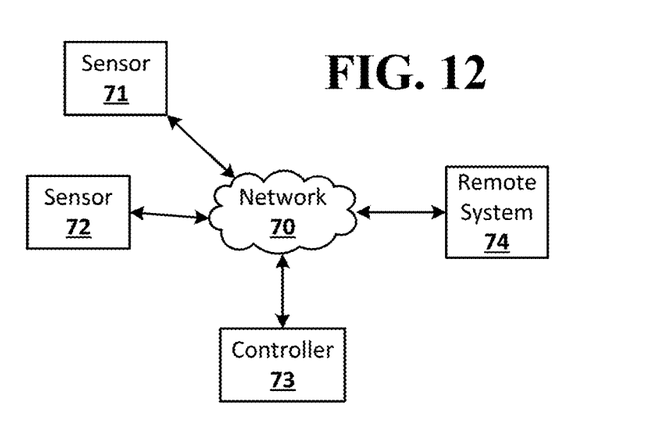
FIG. 12 shows an example of a sensor network according to embodiments of the disclosed subject matter.

FIG. 12 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The sensor network shown in FIG. 12 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include multiple rooms separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 12 may include multiple devices, including intelligent, multi-sensing, network-connected devices, that may integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 12.

For example, a smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 12, and the controller 73 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 12, and the controller 73 may control an alarm system to provide a visual and/or audible alarm to the user of the smart-home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 12 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIG. 12. A smart wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 72, 72 may detect the power and/or speed of a fan, and the controller 73 may adjusting the power and/or speed of the fan, accordingly. Smart wall plugs may control supply of power to one or more wall plugs (e.g., such that power is not supplied to the plug if nobody is detected to be within the smart-home environment). For example, one of the smart wall plugs may controls supply of power to a lamp (not shown).

In embodiments of the disclosed subject matter, a smart-home environment may include one or more intelligent, multi-sensing, network-connected entry detectors (e.g., "smart entry detectors"). Such detectors may be or include one or more of the sensors 71, 72 shown in FIG. 12. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIG. 12 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIG. 12 can be communicatively coupled to each other via the network 70, and to the controller 73 and/or remote system 74 to provide security, safety, and/or comfort for the smart home environment).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively coupled to the network 70), in some embodiments including sensors used by or within the smart-home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event, any of the network-connected smart devices, such as smart wall plugs located outdoors, detect movement at night time, the controller 73 and/or remote system 74 can activate the outdoor lighting system and/or other lights in the smart-home environment.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. Thus, the user may have control over how information is collected about the user and used by a system as disclosed herein.

Embodiments of the presently disclosed subject matter may be implemented in and used with a variety of computing devices. FIG. 13 shows an example of a computing device 20 suitable for implementing embodiments of the presently disclosed subject matter. For example, the device 20 may be used to implement a controller, a device including sensors as disclosed herein, or the like. Alternatively or in addition, the device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, Wi-Fi, Bluetooth®, near-field, and the like. For example, the network interface 29 may allow the device to communicate with other computers via one or more local, wide-area, or other communication networks, as described in further detail herein.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A system comprising:
 a passive infrared sensor configured to detect infrared radiation emitted by an object;
 a lens comprising a plurality of lenslets that are arranged in a circular array and such that at least two lenslets of the plurality of lenslets are nonconcentric,
  wherein different ones of the lenslets are configured to focus the infrared radiation emitted by the object from different directions at different times, and
  wherein different ones of the lenslets have different lens characteristics to provide focused infrared beams of different intensities to the passive infrared sensor; and
 a processor coupled to the passive infrared sensor,
  wherein the processor is configured to estimate a direction of motion of the object based on magnitudes of a signal that is based on detected intensities of the focused infrared beams focused by different ones of the lenslets and received by the passive infrared sensor from different directions at different times, wherein different peaks of the magnitudes of the signal correspond to the different ones of the lenslets and wherein the direction of motion of the object is further estimated based on the different ones of the lenslets to which the peaks of the magnitudes of the signal correspond.

2. The system of claim 1, wherein the passive infrared sensor comprises first and second sensor elements.

3. The system of claim 2, wherein the first and second sensor elements are configured to detect differential infrared energy intensities when the object moves farther from one of the sensor elements and closer to the other one of the sensor elements.

4. The system of claim 3, wherein the differential infrared energy intensities are detected by receiving different amounts of infrared energy by the first and second sensor elements.

5. The system of claim 2, wherein the first and second sensor elements are separated by a center region.

6. The system of claim 1, wherein the lens comprises a Fresnel lens.

7. The system of claim 6, wherein the lenslets of the Fresnel lens comprise a plurality of concentrically positioned lenslets.

8. The system of claim 1, wherein the lens characteristics include at least one of a focal length and a thickness.

9. The system of claim 1, further comprising a memory in communication with the processor, wherein the memory is configured to store a database of patterns of a plurality of additional moving objects.

10. The system of claim 9, wherein the database of patterns of the additional moving objects is based on simulated movements of the additional moving objects.

11. The system of claim 9, wherein the database of patterns of the additional moving objects is based on statistics of actual movements of the additional moving objects detected by the passive infrared sensor.

12. The system of claim 9, wherein the database of patterns of the additional moving objects is based on known characteristics of an environment being monitored by the passive infrared sensor.

13. The system of claim 9, wherein the processor is configured to estimate the direction of motion of the object based on matching the database of patterns of the additional moving objects with the detected intensities of the infrared beam focused by different ones of the lenslets and received by the passive infrared sensor from different directions at different times.

14. A method comprising:
providing a passive infrared sensor configured to detect infrared radiation emitted by an object;
providing a lens comprising a plurality of lenslets that are arranged in a circular array and such that at least two lenslets of the plurality of lenslets are nonconcentric,
wherein different ones of the lenslets are configured to focus the infrared radiation emitted by the object from different directions at different times, and
wherein different ones of the lenslets have different lens characteristics to provide focused infrared beams of different intensities to the passive infrared sensor; and
providing a processor coupled to the passive infrared sensor,
wherein the processor is configured to estimate a direction of motion of the object based on magnitudes of a signal that is based on detected intensities of the focused infrared beams focused by different ones of the lenslets and received by the passive infrared sensor from different directions at different times, wherein different peaks of the magnitudes of the signal correspond to the different ones of the lenslets and wherein the direction of motion of the object is further estimated based on the different ones of the lenslets to which the peaks of the magnitudes of the signal correspond.

15. The method of claim 14, wherein providing the passive infrared sensor comprises providing first and second sensor elements configured to detect differential infrared energy intensities when the object moves farther from one of the sensor elements and closer to the other one of the sensor elements.

16. The method of claim 14, wherein providing the lens comprises providing different focal lengths or different thicknesses for different ones of the lenslets.

17. The method of claim 14, further comprising providing a memory in communication with the processor, wherein the memory is configured to store a database of patterns of a plurality of additional moving objects.

18. The method of claim 17, wherein the database of patterns of the additional moving objects is based on simulated movements of the additional moving objects.

19. The method of claim 17, wherein the database of patterns of the additional moving objects is based on statistics of actual movements of the additional moving objects detected by the passive infrared sensor.

20. The method of claim 17, wherein the database of patterns of the additional moving objects is based on known characteristics of an environment being monitored by the passive infrared sensor.

21. The method of claim 17, wherein the processor is configured to estimate the direction of motion of the object based on matching the database of patterns of the additional moving objects with the detected intensities of the infrared beam focused by different ones of the lenslets and received by the passive infrared sensor from different directions at different times.

* * * * *